Feb. 11, 1969  D. F. BORN  3,426,426
SLICED CIRCUITRY
Filed Feb. 27, 1967
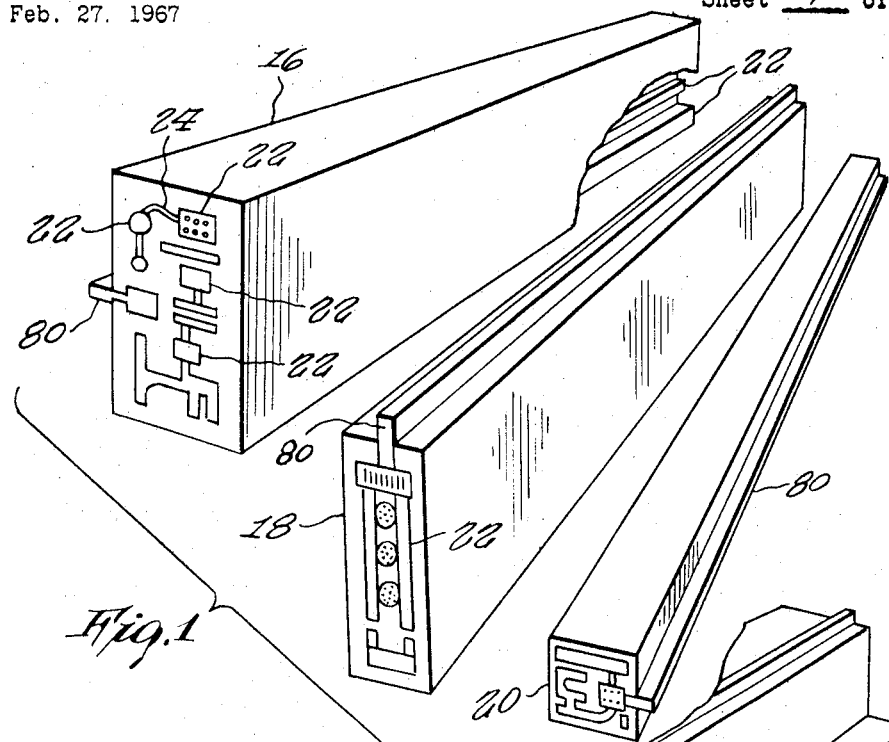
Fig.1
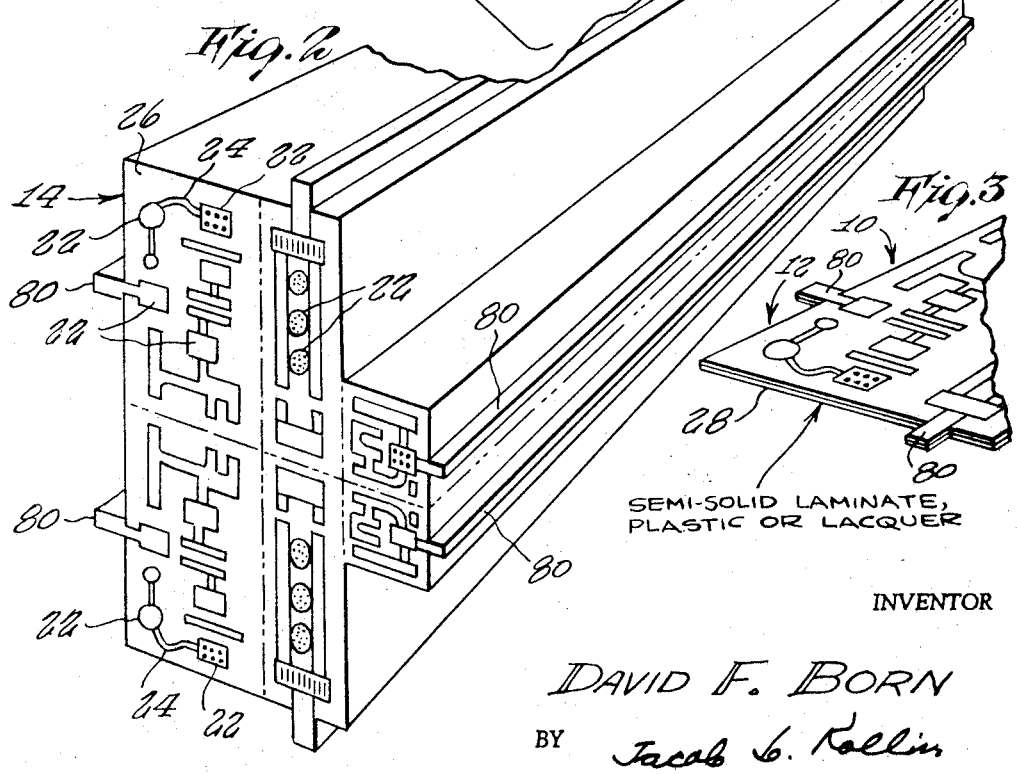
Fig.2
Fig.3
SEMI-SOLID LAMINATE, PLASTIC OR LACQUER
INVENTOR
DAVID F. BORN
BY Jacob C. Rollin
ATTORNEY

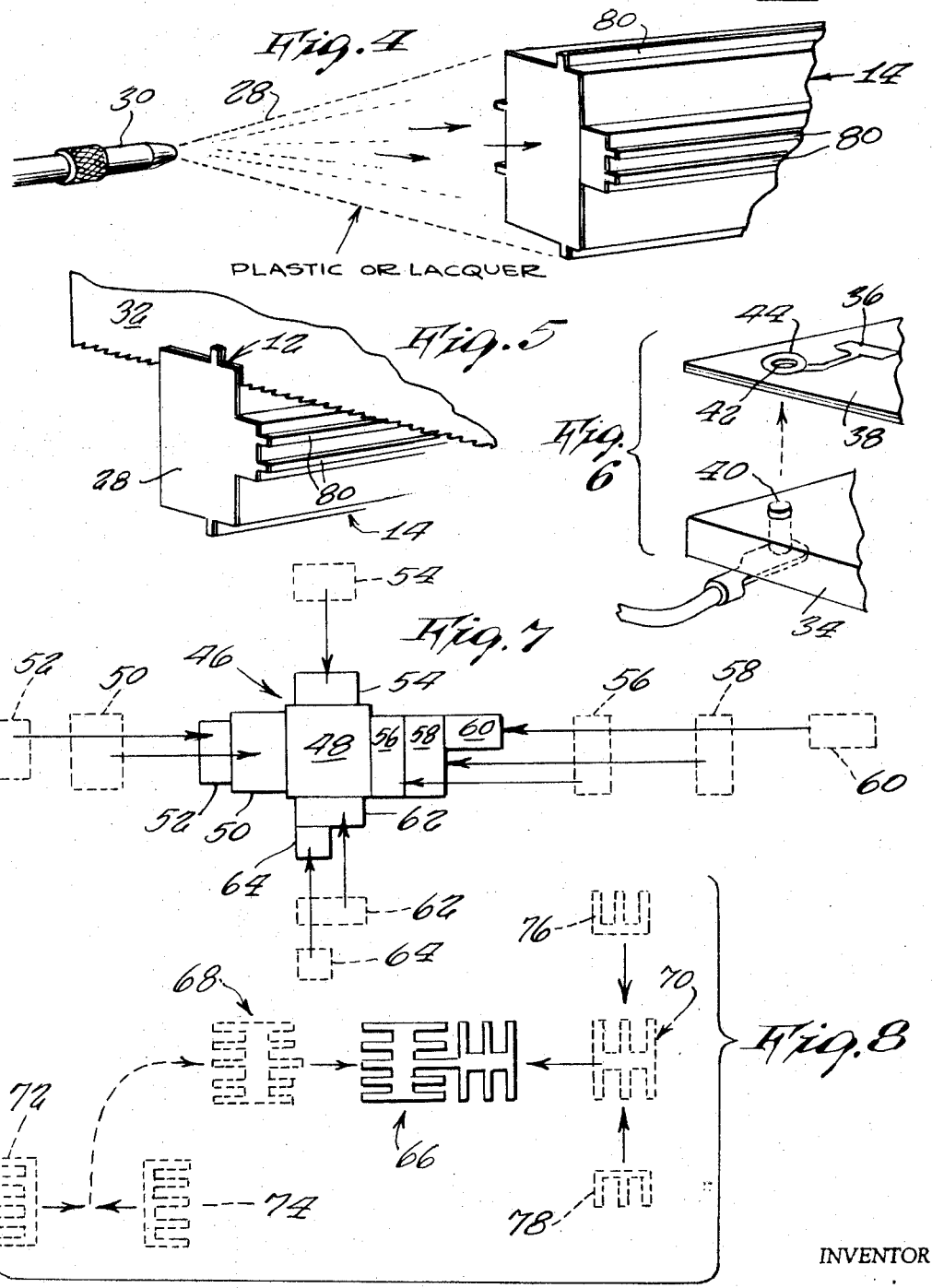

United States Patent Office 3,426,426
Patented Feb. 11, 1969

3,426,426
SLICED CIRCUITRY
David F. Born, Youngstown, Ohio
(807 Longview, Akron, Ohio 44307)
Filed Feb. 27, 1967, Ser. No. 618,820
U.S. Cl. 29—624
Int. Cl. H01b 13/00; H05k 13/00
1 Claim

ABSTRACT OF THE DISCLOSURE

Identical electrical, electronic or other complex configurations and a method for producing these by forming bars have a cross-sectional configuration of a portion of a circuit. The bars are arranged adjacent each other to form a cross-sectional configuration of a component of a circuit or a whole circuit. The spaces between the bars are filled with an electrically non-conductive liquid material which is subsequently hardened into a solid bar assembly. The bar is then sliced like bologna into sheets which constitute a complete component of a circuit or a whole circuit. The bars are provided with mating protruding electrical conductors and mating slots along their lengths, thus making it possible to join two or more bars and thus form multiples of circuits.

Background of the invention

This invention relates generally to prefabricated electrical circuits. More specifically it relates to processes for mass producing electrical or electronic circuits of other complex configurations, and is an improvement of my U.S. patent application Ser. No. 574,786 entitled, "Sliced Circuitry," filed Aug. 24, 1966.

In the earlier patent application, there was disclosed a process for mass producing identical electrical or electronic components, particularly miniature circuits or parts, without the necessity of building the units individually. In this process long bars were first made from electrically conductive material; each bar having a transverse cross-sectional configuration that comprised a portion of an electrical circuit; the bars next being arranged adjacent each other to form in transverse cross-sectional configuration a complete electrical component of a circuit or a whole circuit after which the longitudinal spaces around the bars were filled with an electrically non-conductive material in liquid state which afterwards hardened to form a solid bar assembly that subsequently could be sliced like bologna, and made into sheets each of which comprised a complete electrical component of a circuit or a whole circuit that could be installed into various electrical appliances or electronic equipment.

A principal object of the present invention is to provide an improved sliced circuitry wherein a plurality of the above described bar assemblies are brought adjacent each other in the manner of a bundle of sticks, each of the bar assemblies having a specific circuit component or circuit that may be different from that of the others, the bars thus arranged being secured together and which when sliced will produce a large complex circuit sheet.

Another object of the present invention is to provide an improved sliced circuitry wherein the bar assemblies may be secured together by seam welding adjacent electrical conductors protruding from adjacent bar assemblies, by corresponding ribs and slots between the bar assemblies, by adhesives, by tying together or by being merely pressed together.

Yet another object is to provide an improved sliced circuitry wherein the end of the circuit bar assembly may be coated with a non-conductive substance such as plastic, rubber lacquer, or a semi-solid laminate of such substance may be placed on the end to be sliced, prior to the slicing operation.

Yet another object is to provide an improved sliced circuitry wherein the above described application of non-conductive substance on the end of the circuit bar assembly will secure in place the component parts of the circuit both during and after the slicing operation; this being particularly desirable where the slice is exceedingly thin.

Yet another object is to provide an improved sliced circuitry wherein the non-conductive subtsance on the end of the circuit bar assembly will provide an electrically non-conductive base to the slice cut off the end of the bar assembly.

Yet another object is to provide an imprived sliced circuit wherein the base could contain a second circuit complementary to the circuit to be sliced from the circuit bar assembly or contain connecting leads for it.

Yet another object is to provide an improved sliced sliced circuit wherein the above described base and sliced circuit could be properly aligned by employment of male inserts on the base which are receivable within female corresponding parts in the sliced circuit.

Yet another object is to provide an improved sliced circuitry wherein, for certain advantages, a complex circuit bar may be formed in phases; namely a central part of the bar is first constructed and cast with thermoplastic and then more components may be added to it, around the central part, this assembly then being re-cast in thermoplastic to complete the complex circuit bar.

Another object is to provide an improved sliced circuitry using a thermoplastic or other non-conductive material of a lower melting point so that the first configuration with its "fill" would not be disturbed by the heat of a second casting process.

Yet another object is to provide an improved sliced circuitry wherein a complete circuit bar is formed which does not contain any non-conductive supporting "fill"; such circuit bar being of a type which might be used to make high capacity circuits such as those used in main breaker switch boxes.

Yet another object is to provide an improved sliced circuitry for constructing other comuplex configurations not necessarily electrical.

Other objects are to produce an improved sliced circuitry which is simple in design, inexpensive to manufacture, rugged in construction, easy to use and efficient in operation.

These and other objects will be readily evident upon a study of the following specification and the accompanying drawing wherein:

FIG. 1 is a perspective view of several circuit bars, shown separated prior to assembly.

FIG. 2 is a perspective view of a complex circuit bar comprised of circuit bars such as illustrated in FIGURE 1.

FIG. 3 is a fragmentary perspective view of a finished circuit sliced from the complex circuit bar illustrated in FIGURE 2.

FIG. 4 is a perspective view showing application of a non-conductive substance to an end of the complex circuit bar prior to slicing operation.

FIG. 5 is a perspective view showing a subsequent slicing operation after application of the non-conductive substance to the end of the complex circuit bar.

FIG. 6 is a fragmentary perspective view of a sliced circuit and a base incorporating a second circuit which would join together before the slice is separated from the circuit bar.

FIG. 7 is an end view of a complex circuit bar, shown diagrammatically, and showing assembly thereof in phases, and FIG. 8 is an end view of a circuit bar having no non-conductive fill, and illustrating the assembly thereof in phases.

Referring now to the drawings in detail, the reference numeral 10 represents an improved sliced circuitry according to the present invention, wherein a finished circuit slice 12 is made from a complex circuit bar 14 that is formed from several individually completed circuit bars 16, 18 and 20.

Each of the circuit bars 16, 18 and 20 are manufactured by the process described in detail in my previous patent application Ser. No. 574,786 wherein a plurality of elongated bars 22 made of electrically conductive material are secured together so as to form in cross-section an electrical circuit. The bars 22 may be variously configurated and may include sheets 24 made of copper or the like, which in cross-section form the connecting "wires" between various electrical components. The bars thus assembled are placed into molds and a "fill" of electrically non-conductive substance is poured therein to fill the space between the bars, the assembled bars and non-conductive substance being removed from the mold after the latter has set and hardened to form a support for the conductive materials.

In the present invention the circuit bars 16, 18, and 20 are then secured together, in the manner of a bundle of sticks, to form the complex circuit bar 19, securement being accomplished by seam welding adjacent electrical conductors protruding from adjacent bar assemblies, by interfitting corresponding ribs and slots between the bar assemblies, by heat sealing the non-conductive substances, by adhesive application, by tying together, by merely pressing together or by re-casting the supporting "fill" of non-conductive substance.

Prior to the slicing operation the end wall 26 of the complex circuit bar 14 may be coated with an electrically non-conductive substance 28 for the purpose of securing in place the component parts of the circuit both during and after the slicing operation this being particularly desirable wherein the slice will be exceedingly thin. Additionally the non-conductive material will provide an electrically non-conductive base for the slice cut off the end of the bar assembly. The non-conductive material may comprise a plastic, rubber or lacquer or other adhesive substances which may be sprayed on the end or the bar may be dipped into such substance. Otherwise a semi-solid laminate of such substance may be placed on the bar end.

After the non-conductive substance is secured, the bar 14 is sliced adjacent the coated end by a saw 32, to the desired thickness to form the finished circuit slice 12, shown in FIG. 3.

As shown in FIG. 6, the base 34 may include electrical components which are electrically engageable with the circuit 36 in the slice 38, prior to slicing and may include male inserts 40 engageable within openings 42 of terminals 44 located in the circuit. The openings 42 of terminal 44 further provide means for connection with wires of electrical parts such as resistors or power source cables.

In FIGURE 7, a complex circuit bar 46 is shown which is assembled by phases as is indicated by the phantom lines. Such assembly may be desirable in certain instances. In this construction a central circuit bar 48 is first made and cast with thermoplastic. Thereafter other circuit bars 50 to 64 are added therearound one at a time, thus building up the assembly outwardly; somewhat in the manner of pieces in a picture jig saw puzzle.

In FIGURE 8, a modified circuit bar 66 is shown, which includes only the electrically conductive components but which excludes the thermoplastic "fill" above described. This construction would be most practical for producing high capacity circuits such as those used in the main breaker-switch boxes. In the construction shown, the bar 66 is comprised of components 68 and 70 assembled together, which in turn are comprised of sub-components 72, 74, 76 and 78.

Thus there have been shown an improved sliced circuitry having numerous practical advantages.

It is to be noted that the circuit bars may be constructed leaving opposed conductors 80, as shown in FIGURES 1 and 2, which extend out of the non-conductive "fill" to act as leads or terminals in the sliced-off circuitry.

While various changes may be made in the detail construction it is understood that such changes will be within the spirit and scope of the present invention as is defined by the appended claim.

I claim:

1. The process of producing sliced circuitry of electrical or electronic circuits which includes the steps of forming a plurality of solid substantially rectangular bars having planar ends and of non-conductive material in which is embedded longitudinally thereof bars of electrically conductive material each having a transverse cross-sectional configuration that comprises a portion of an electrical circuit, assembling by phases said solid bars about a central solid bar, integrally securing said assembled bars together with their ends in a common plane to form a bundle, wherein the cross-sectional configuration thereof will produce a complex circuit, applying a plastic non-conductive coating on the end of said bundle to secure and support said bars, and slicing a thin sheet of circuitry from the end thereof, and thereafter applying a like coating to the sliced end, before an additional thin sheet is sliced therefrom whereby extremely thin sheets may be produced.

References Cited

UNITED STATES PATENTS

| 3,114,807 | 12/1963 | Koda | 174—68.5 X |
| 3,235,428 | 2/1966 | Naymik. | |
| 3,325,881 | 6/1967 | Engelking | 29—423 X |

FOREIGN PATENTS 700,496  12/1953  Great Britain.

OTHER REFERENCES

Hallstead et al., "Ferrite Core Memory Construction," IBM Tech. Disclosure Bulletin, vol. No. 6, No. 3, August 1963, p. 64.

ROBERT K. SCHAEFER, *Primary Examiner.*

DAVID SMITH, JR., *Assistant Examiner.*

U.S. Cl. X.R.

29—417, 423; 317—101